(12) United States Patent
Lee et al.

(10) Patent No.: US 9,172,530 B2
(45) Date of Patent: Oct. 27, 2015

(54) APPARATUS AND METHOD FOR GENERATING SECRET KEY FOR ID-BASED ENCRYPTION SYSTEM AND RECORDING MEDIUM HAVING PROGRAM RECORDED THEREON FOR CAUSING COMPUTER TO EXECUTE THE METHOD

(71) Applicant: SAMSUNG SDS CO., LTD., Seoul (KR)

(72) Inventors: Seon Young Lee, Seoul (KR); Ki Sang Kwon, Seoul (KR); Hyo Jin Yoon, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 67 days.

(21) Appl. No.: 13/906,867

(22) Filed: May 31, 2013

(65) Prior Publication Data

US 2013/0322620 A1    Dec. 5, 2013

(30) Foreign Application Priority Data

May 31, 2012  (KR) ........................ 10-2012-0058712

(51) Int. Cl.
*H04L 29/06* (2006.01)
*H04L 9/08* (2006.01)
*H04L 9/30* (2006.01)

(52) U.S. Cl.
CPC ............ *H04L 9/0816* (2013.01); *H04L 9/3006* (2013.01); *H04L 9/3066* (2013.01)

(58) Field of Classification Search
CPC .... H04L 9/0816; H04L 9/3006; H04L 9/3066
USPC ........................................................... 380/44
See application file for complete search history.

(56) References Cited

U.S. PATENT DOCUMENTS

| | | | |
|---|---|---|---|
| 5,150,411 A | | 9/1992 | Maurer |
| 6,230,269 B1 * | | 5/2001 | Spies et al. ................... 713/182 |
| 8,255,464 B2 * | | 8/2012 | Wilkins ....................... 709/206 |

(Continued)

FOREIGN PATENT DOCUMENTS

| | | |
|---|---|---|
| KR | 10-2001-0003569 A | 1/2001 |
| KR | 10-2007-0096014 A | 10/2007 |
| WO | 2009/090750 A1 | 7/2009 |

OTHER PUBLICATIONS

International Search Report for PCT/KR2013/004307 dated Sep. 30, 2013 [PCT/ISA/210].

*Primary Examiner* — David Garcia Cervetti
(74) *Attorney, Agent, or Firm* — Sughrue Mion, PLLC (57) ABSTRACT

A private key generation apparatus for generating a private key corresponding to a user ID using the user ID as a public key is disclosed. When a user ID is input, an ID conversion unit outputs a specific element value of a discrete logarithm cyclic group having a one-to-one correspondence relationship with an input user ID. A private key calculation unit calculates a discrete logarithm result value based on the output specific element value of the discrete logarithm cyclic group and calculates a private key having a one-to-one correspondence relationship with the user ID. According to the present invention, it is possible to concretely propose a method of calculating a secret key, capable of guaranteeing a one-to-one correspondence relationship between the ID and the private key by applying a method of calculating a discrete logarithm using the pre-computation table in an ID-based encryption system.

23 Claims, 6 Drawing Sheets

(56) References Cited

U.S. PATENT DOCUMENTS

| | | | |
|---|---|---|---|
| 8,364,711 B2 * | 1/2013 | Wilkins et al. | 707/783 |
| 2003/0081785 A1 * | 5/2003 | Boneh et al. | 380/277 |
| 2005/0097316 A1 | 5/2005 | Kim | |
| 2005/0193048 A1 | 9/2005 | Vaudenay et al. | |
| 2007/0240206 A1 * | 10/2007 | Wu et al. | 726/8 |
| 2007/0266118 A1 * | 11/2007 | Wilkins | 709/219 |
| 2007/0266156 A1 * | 11/2007 | Wilkins | 709/225 |
| 2008/0205655 A1 * | 8/2008 | Wilkins et al. | 380/279 |
| 2009/0034714 A9 * | 2/2009 | Boneh et al. | 380/28 |
| 2010/0208895 A1 * | 8/2010 | Boneh et al. | 380/278 |
| 2012/0159188 A1 * | 6/2012 | Boneh et al. | 713/189 |

* cited by examiner

ID-BASED
APPARATUS AND METHOD FOR GENERATING SECRET KEY FOR ID-BASED ENCRYPTION SYSTEM AND RECORDING MEDIUM HAVING PROGRAM RECORDED THEREON FOR CAUSING COMPUTER TO EXECUTE THE METHOD

CROSS-REFERENCE TO RELATED APPLICATION

This application claims priority to and the benefit of Republic of Korea Patent Application No. 10-2012-0058712, filed on May 31, 2012, the disclosure of which is incorporated herein by reference in its entirety.

BACKGROUND

1. Field of the Invention

The present invention relates to an apparatus and method for generating a private key for an ID-based encryption system and a recording medium having a program recorded thereon for causing a computer to execute the method, and more specifically, to an apparatus and method for generating a private key for an ID-based encryption system using a method of calculating a discrete logarithm using a pre-computation table and a recording medium having a program recorded thereon for causing a computer to execute the method.

2. Discussion of Related Art

With recent development of computer technology and rapid expansion of communication networks, a security of computer-related resources and transmitted data is a big issue. An encryption based system is used as one alternative capable of resolving such a problem. An encryption system making a greatest contribution so far is a public key encryption system. In this traditional public key system, it is necessary to authenticate a user's public key in advance, and a problematic certificate should be discarded even though a validity period remains. Accordingly, there is a difficulty associated with management of a certificate of the public key. Therefore, an identity (ID)-based public key system based on personal identity (ID) has been proposed.

Technical approaches for implementing ID-based encryption include a scheme using pairing of an elliptic curve, a quadratic residue use scheme, a lattice use scheme, a trapdoor discrete logarithm (TDL) group use scheme, etc. The scheme using pairing of an elliptic curve is a scheme that is currently feasible, most universal, and actively studied. However, since this technology includes a pairing operation, an implementation method is very complex and much computing power is necessary.

On the other hand, the method of calculating a discrete logarithm using a TDL group may be implemented using an exponentiation operation relatively simpler than the pairing. In particular, an ID-based encryption system having a feasible level computing power and speed may be built using a pre-computation table. However, implementation of an ID-based encryption using TDL technology is considered to be theoretically possible and an actual implementation method is not disclosed. This means that the TDL technology has only been applied to solve a general discrete logarithm problem. Accordingly, to apply the TDL technology to an ID-based encryption system, a specific method should be proposed.

Related arts will be described in detail. US Patent Publication No. 2005-0097316 (Title of Invention: Digital signature method based on identification information of group members, and method of acquiring identification information of signed-group member, and digital signature system for performing digital signature based on identification information of group members) is directed to data encryption using a public key encryption scheme based on identification information of one or more members belonging to the same group. The present invention is directed to an algorithm for deriving a real private key in applying a method of calculating a discrete logarithm using a pre-computation table, and differs from the related art in a configuration.

Further, a digital signature apparatus having different personal private keys in a plurality of financial institutions while storing one personal private key in a remote financial service authentication system is disclosed in Korean Patent Laid-Open Publication No. 2001-0003569 (Title of Invention: Apparatus for generating digital signature based on private-key/public-key). The present invention is directed to an algorithm for deriving a real private key in applying a method of calculating a discrete logarithm using a pre-computation table, and differs from the related art in a configuration.

SUMMARY OF THE INVENTION

Another object of the present invention is to provide a private key generation apparatus and method for an ID-based encryption system, which concretely propose a method of calculating a private key by applying a method of calculating a discrete logarithm using a pre-computation table in an ID-based encryption system.

According to an aspect of the present invention, there is provided a private key generation apparatus for an ID-based encryption system, which is a private key generation apparatus for generating a private key corresponding to a user ID using the user ID as a public key, the apparatus including: an ID conversion unit that outputs a specific element value of a discrete logarithm cyclic group having a one-to-one correspondence relationship with an input user ID; and a private key calculation unit that calculates a discrete logarithm result value based on the output specific element value of the discrete logarithm cyclic group and calculates a private key having a one-to-one correspondence relationship with the user ID According to another aspect of the present invention, there is provided a private key generation method for an ID-based encryption system, which is a private key generation method performed by a private key generation apparatus for generating a private key corresponding to a user ID using the user ID as a public key, the method including: (a) outputting a specific element value of a discrete logarithm cyclic group having a one-to-one correspondence relationship with an input user ID; and (b) calculating a discrete logarithm result value based on the output specific element value of the discrete logarithm cyclic group and calculating a private key having a one-to-one correspondence relationship with the user ID.

According to still another aspect of the present invention, there is provided a private key generation method for an ID-based encryption system, which is a private key generation method performed by a private key generation apparatus for generating a private key corresponding to a user ID using the user ID as a public key, the method including: setting predetermined parameters in advance before the user ID is input for one-to-one correspondence between the input user ID and a discrete logarithm result value.

According to still another aspect of the present invention, there is provided a private key generation method for an ID-based encryption system, which is a private key generation method performed by a private key generation apparatus for generating a private key corresponding to a user ID using the user ID as a public key, the method including: determining a previously set jacobi value based on the user ID to output a specific element value of a discrete logarithm cyclic group having a one-to-one correspondence relationship with the input user ID.

According to the apparatus and method for generating a private key for an ID-based encryption system in the present invention, it is possible to concretely propose a method of calculating a secret key, capable of guaranteeing a one-to-one correspondence relationship between the ID and the private key by applying a method of calculating a discrete logarithm using the pre-computation table in the ID-based encryption system.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of an apparatus and method for generating a private key for an ID-based encryption system according to the present invention will be described in detail with reference to the accompanying drawings.

Figure 1:
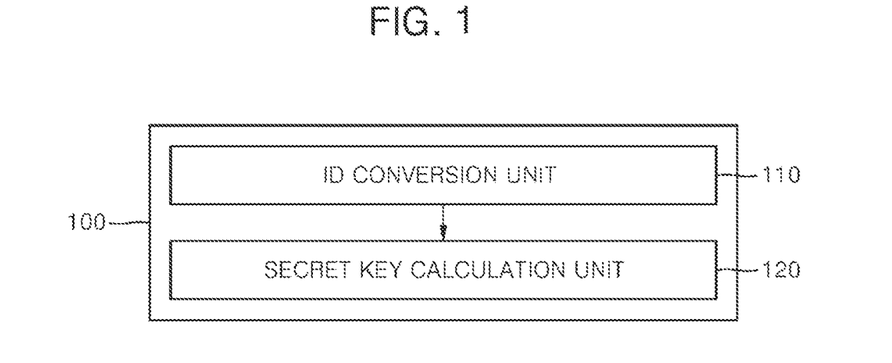
FIG. 1 is a block diagram illustrating a configuration of a private key generation apparatus according to the present invention.
Figure 2:
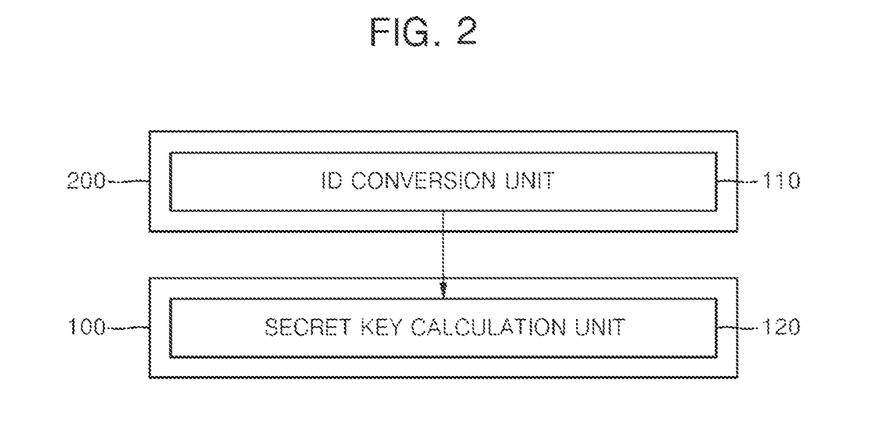
FIG. 2 is a block diagram illustrating a configuration of a private key generation apparatus according to an embodiment of the present invention.

FIG. 1 is a block diagram illustrating a configuration of a private key generation apparatus 100 according to the present invention. Refer to FIG. 1, the private key generation apparatus 100 includes an ID conversion unit 110 and a private key calculation unit 120. However, the ID conversion unit 110 may be configured in a separate client or a server 200, independently from the private key calculation unit 120, as shown in FIG. 2.

Figure 3:
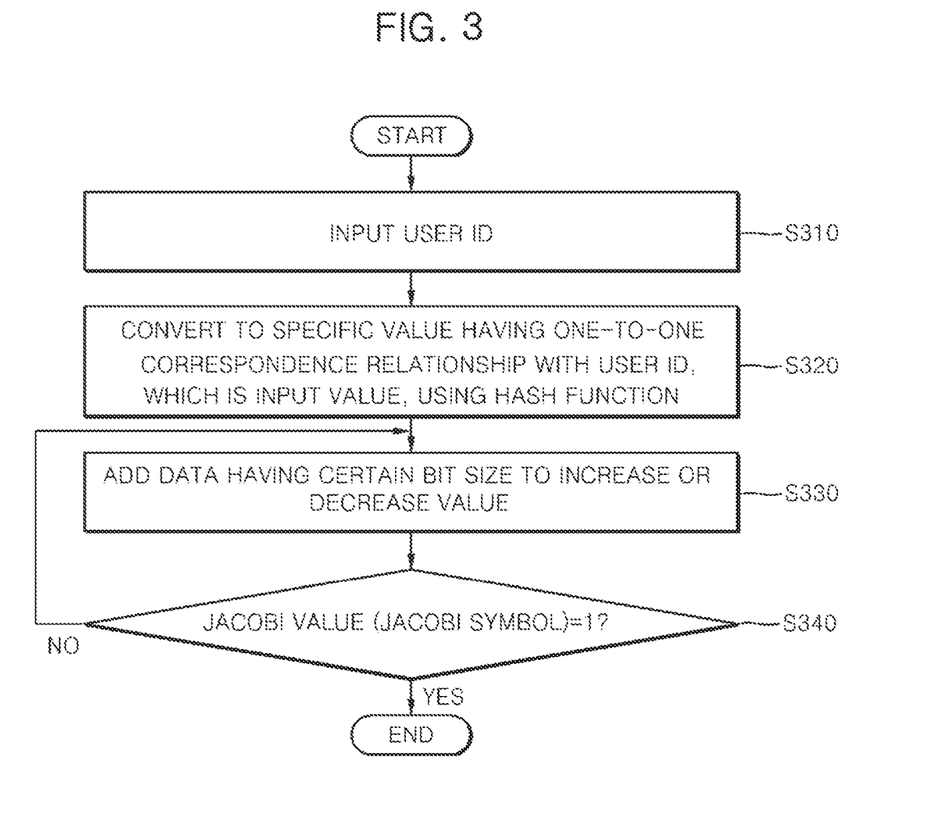
FIG. 3 is a diagram illustrating a process performed in an ID conversion unit that is one component of the private key generation apparatus according to the present invention.

When a user ID is input, the ID conversion unit 110 outputs a specific element value of a discrete logarithm cyclic group having a one-to-one correspondence relationship with the input user ID. Refer to FIG. 3, the ID conversion unit 110 applies a hash function to the input user ID to generate a first conversion value of a number having a certain length so that the user ID (S310) that is the input value and the specific element value that is the output value have a one-to-one correspondence relationship (S320). In this case, a function in which a one-to-one correspondence relationship is established between the input value and the output value should be used, and it is desirable to use a general hash function.

Then, the ID conversion unit 110 generates a second conversion value obtained by adding data having a certain bit size to the first conversion value (S330), and determines whether a jacobi value (jacobi symbol) of the second conversion value is a previously set reference value (e.g., the reference value=1) (S340). When the jacobi value (Jacobi symbol) of the second conversion value is not the previously set reference value (e.g., the reference value=1), the added data value having the certain bit size is continuously increased and decreased. In this case, the jacobi value (jacobi symbol) refers to a function for determining whether any number is a quadratic residue.

Through this process, when the input user ID is an ID not suitable for use in the ID-based encryption system according to the present invention, the ID is systematically changed and used instead of making a request for a change of the user ID, thus increasing usability.

More specifically, when the input ID is a text "Bob," letters "Bob" is stored as a certain number such as Unicode in a computer. In this case, a general hash function (e.g., SHA1) is applied to the stored number, which is then converted to a number having a certain length, thereby generating the first conversion value. In other words, a conversion value having a one-to-one correspondence relationship with the user ID may be created using a value of a previously set length irrespective of the length of the input ID.

Then, data having a certain bit size is added to the first conversion value. For example, when the first conversion value having a 20 byte size has been created by applying a Unicode value "Bob" to a SHA1 hash function, 1 byte is added to the first conversion value in an arbitrary form such as "00000000" to create a total of 21 byte value. When the jacobi value (Jacobi symbol) of any value of the created 21 bytes is not a previously set reference value (e.g., reference value=1), a part "00000000" of the added 1 byte is incremented by 1 to change a total of 21 byte value in the form of "00000001"→"00000010"→"00000011"→ . . . , thus creating the second conversion value.

Figure 4:
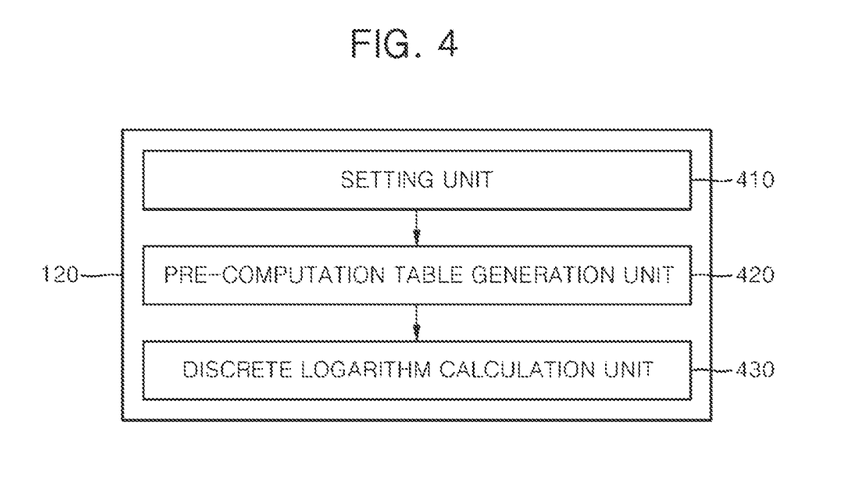
FIG. 4 is a block diagram illustrating a configuration of a private key calculation unit according to the present invention.

The private key calculation unit 120 receives this second conversion value, i.e., a specific element value of the discrete logarithm cyclic group, and calculates a discrete logarithm result value using the pre-computation table to calculate a private key having a one-to-one correspondence relationship with to the user ID. Referring to FIG. 4, the private key calculation unit 120 includes a setting unit 410, a pre-computation table generation unit 420, and a discrete logarithm calculation unit 430.

Figure 5:
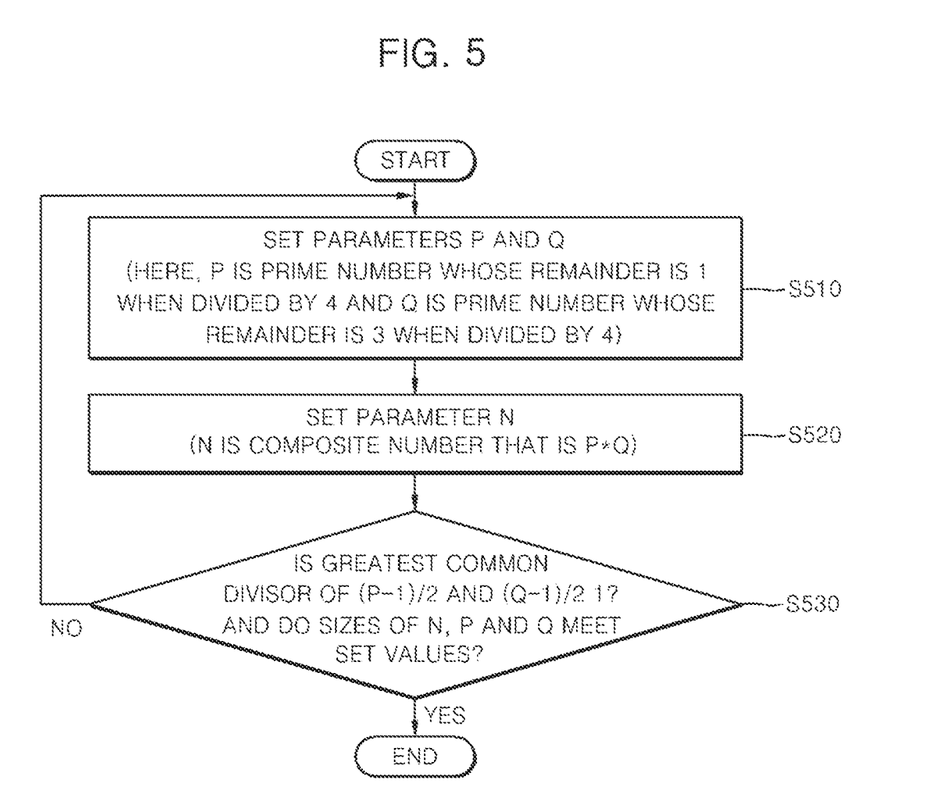
FIG. 5 is a diagram illustrating a process performed in a setting unit that is one component of the private key calculation unit according to the present invention.

The setting unit 410 sets parameters for one-to-one correspondence between the input user ID and the discrete logarithm result value. In other words, the parameters are set so that the user ID that is the input value and the discrete logarithm value that is the output value correspond to each other in 1:1 rather than N:1. For this, referring to FIG. 5, a parameter P is set to a prime number whose remainder is 1 when divided by 4, a parameter Q is set to a prime number whose remainder is 3 when divided by 4 (S510), and N (N=P*Q) is defined as a composite number using the parameters P and Q (S520) to set a size of each parameter. Then, a confirmation is performed as to whether the greatest common divisor of (P−1)/2 and (Q−1)/2 is 1 using each parameter and whether the sizes of the respective parameters N, P and Q meet the set values (S530).

Figure 6:
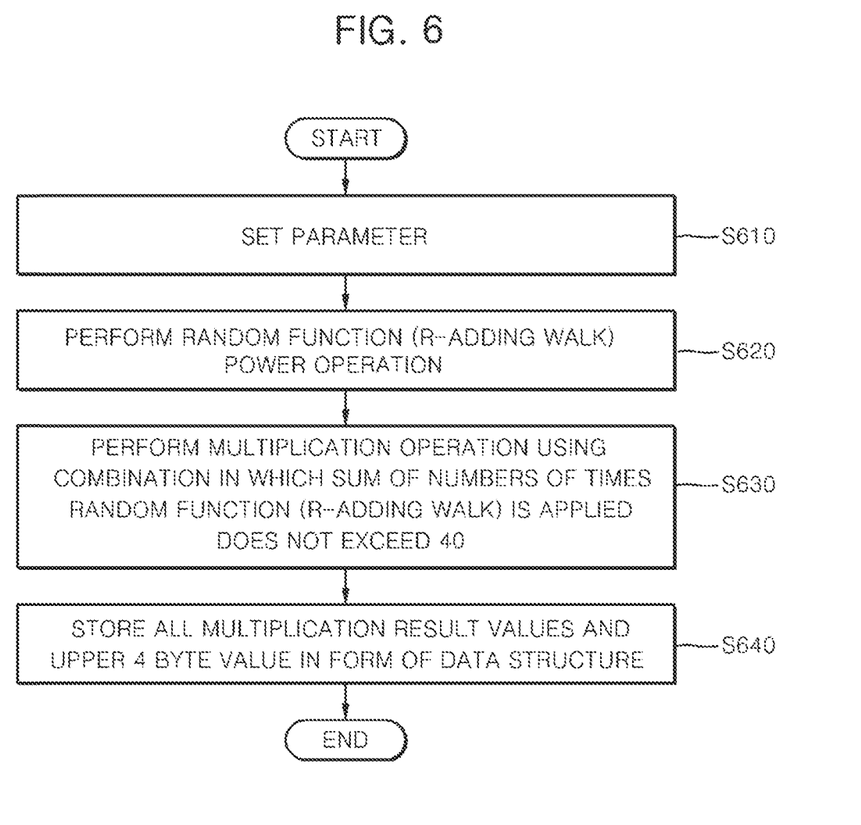
FIGS. 6 and 7 are diagrams illustrating processes performed in a pre-computation table generation unit that is one component of the private key calculation unit according to the present invention.
Figure 7:
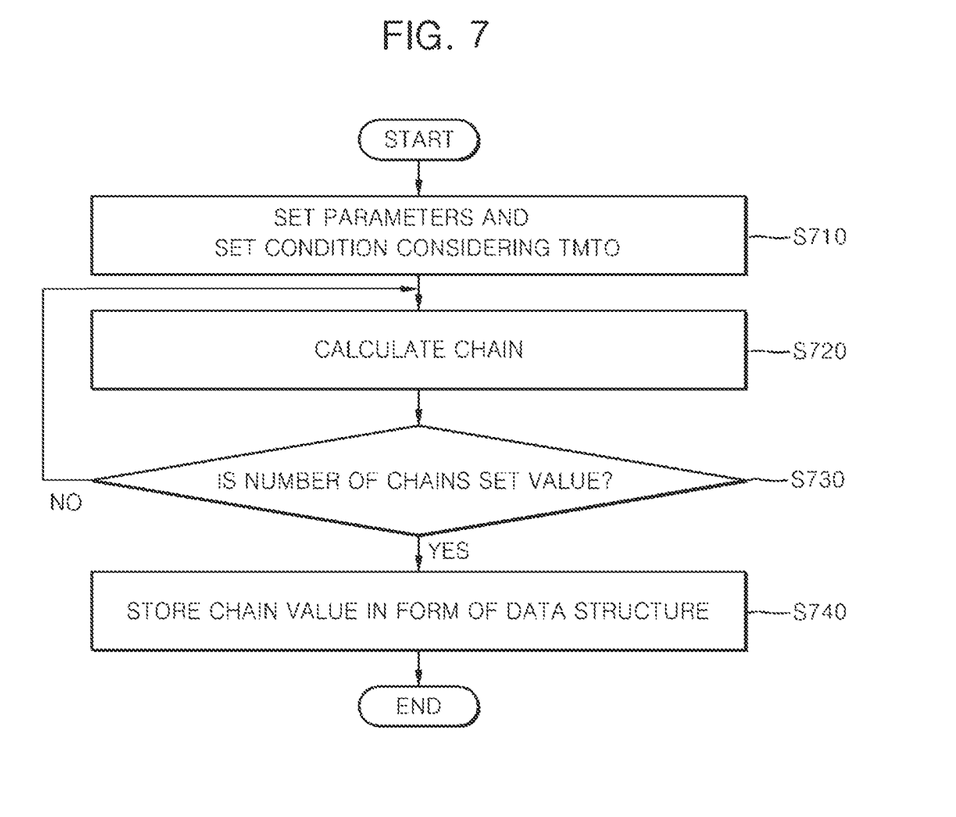

The pre-computation table generation unit 420 stores a value of a result of performing a multiplication operation using the parameters set by the setting unit 410, in the form of a data structure for share between respective modules, to generate a lookup table, and stores a chain value of a cyclic function value considering time-memory trade off (TMTO) using the lookup table, in the form of a data structure to generate the pre-computation table. Referring to FIGS. 6 and 7, the pre-computation table generation unit 420 performs a process of storing all values of the multiplication results and a value of higher 4 bytes in the form of a data structure. This is intended to generate a lookup table that enables calculation to be rapidly performed through pre-calculation/storage instead of each multiplication operation being performed each time a random function (r-adding walk) is applied. This lookup table may be stored and used in an internal memory or may be stored in an external storage device. The prepared lookup table is used to calculate the chain.

Figure 8:
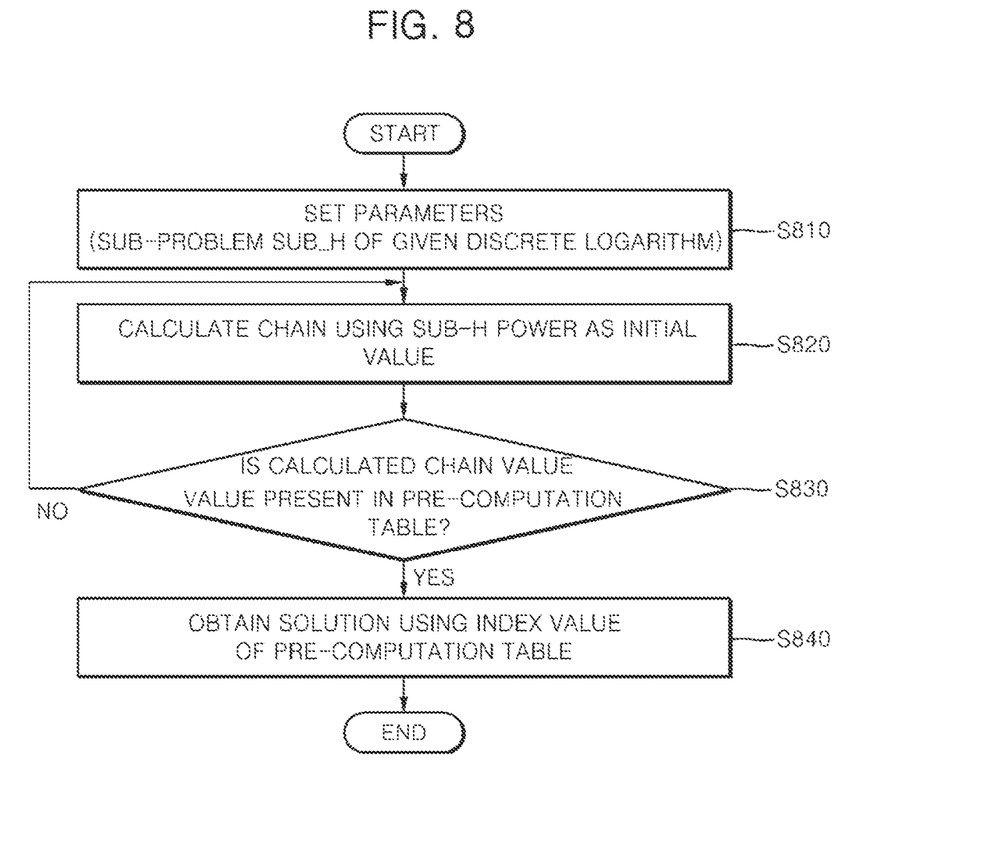
FIG. 8 is a diagram illustrating a process performed in a discrete logarithm calculation unit that is one component of the private key calculation unit according to the present invention.

The discrete logarithm calculation unit 430 receives data from the setting unit 410 and the pre-computation table generation unit 420 and calculates a discrete logarithm result value using an index value of the pre-computation table. Referring to FIG. 8, in order to guarantee the one-to-one correspondence relationship between the ID and the private key, the discrete logarithm result value is calculated based on the index values of the pre-computation table for the parameters P and Q set by the setting unit 410.

In other words, all IDs input to the private key generation apparatus 100 are converted to specific element values of one discrete logarithm cyclic group by the ID conversion unit 110, and the discrete logarithm value is calculated by the private key calculation unit 120 using the specific element value to issue the private key, thereby establishing the one-to-one correspondence relationship between the ID and the private key.

Therefore, a method of setting parameters for guaranteeing the one-to-one correspondence relationship between the user ID and the private key will be described in detail. A generator g that can generate the discrete logarithm cyclic group used in the present invention should not have a value of a square number. When the generator g is selected, a determination should be made as to whether the generator g is the square number based on the jacobi value (jacobi symbol). When a jacobi value (jacobi symbol) for Jacobi (g/N) is calculated, Jacobi(g/N)=Jacobi (g/P*g/Q) because N is a composite number consisting of P*Q. In this case, since P and Q are prime numbers, a relationship Jacobi(g/N)=Jacobi(g/P*g/Q) =Jacobi(−1*−1)=1 is established. Therefore, when g is selected, the jacobi value (Jacobi symbol) should be necessarily 1.

Further, when the specific element value of the discrete logarithm cyclic group passing through the ID conversion unit 110 is h(=$g^x$), Jacobi(h/N)=Jacobi($g^x$/N)=Jacobi(g/N)$^x$. Accordingly, since Jacobi(g/N)=1 as described above, $1^x$=1.

However, when the jacobi value (Jacobi symbol) is −1, h is not an element of the cyclic group that can be generated with g. The jacobi value (jacobi symbol) of the element of the cyclic group that can be generated with g becomes 1. However, reversely, even when the jacobi value (Jacobi symbol) is 1, h may not be guaranteed to be the element of the g cyclic group.

Therefore, when the setting unit 410 of the private key calculation unit 120 selects P and Q under a condition that P and Q have respective remainders of 1 and 3 when divided by 4, 1*(−1)=−1. Accordingly, when the jacobi value (jacobi symbol) is 1, it is understood that 1*1. In other words, a case in which the jacobi value (jacobi symbol) is 1 disappears since (−1)*(−1)=1.

Therefore, when P and Q are set according to content of the setting unit 410 and if the jacobi value (Jacobi symbol) is 1, it is clearly an element value of the cyclic group that can be generated with g. By deleting one of two cases in which the jacobi value (Jacobi symbol) is 1 through it, all IDs are necessarily converted to element values of one cyclic group by the ID conversion unit 110. The discrete logarithm calculation unit 430 performs calculation using this cyclic group element value and issues the private key, thereby establishing the one-to-one correspondence relationship between the ID and the private key.

The present invention may be applied to a process of generating a private key in an ID-based encryption system. The safety of the ID-based encryption system is determined according to the number of bits of four large-primes. Therefore, a setting value level of the system varies according to a required safety level and must be able to be appropriately reflected.

For example, when the number of bits of the large-prime is determined, the size and the number of small-primes are correspondingly calculated, and the appropriate number of chains is calculated in consideration of time-memory trade off (TMTO).

Further, a condition for a certain pattern is checked when the chain is created. In this pattern, since the number of bits of patterns to be checked decreases as many memories are used, a parameter change must be adaptively possible in consideration of the time-memory trade off (TMTO). Further, this chain condition check process is necessary in the pre-computation table generation unit 420 and the discrete logarithm calculation unit 430, and it must be designed in a structure to which a condition common to the respective modules can be applied.

In other words, in order to constitute a module flexible for a change of the parameters, when conditions meeting a size of a reference bit for determining safety and a time-memory trade off (TMTO) relationship are determined, a total number of prime factors, a condition for determining the chains, and a total number of chains must be regulated correspondingly.

Therefore, the number of prime factors is determined according to a parameter setting result of the setting unit 410, and the size and the number of prime factors constituting P and Q are determined.

For example, P=4*P1*P2*P3* . . . *$P_\alpha$+1 and Q=2*Q1*Q2*Q3* . . . *$Q_\alpha$+1. In other words, P and Q are prime numbers whose remainders are 1 and 3 when divided by 4, respectively. In this case, P1, P2, Q1, and Q2 refer to large-primes having an 80 bit size for satisfying 80-bit safety, and $_\alpha$ refers to the number of prime factors constituting P and Q. The large-prime among the prime factors constituting P and Q is determined in a safety level (has a 80 bit size in the case of 80 bit safety and a 60 bit size in the case of 60 bit safety). When remaining P3 to $P_\alpha$ and Q3 to $Q_\alpha$ other than the large-prime are small-primes, a size of the small-prime is a half of the size of the large-prime.

The number of prime factors is set so that N has a 1024 bit size when all the prime factors are multiplied. In other words, when N has a 1024 bit size and the number of large primes having a 80 bit size is fixed to 4 (P1, P2, Q1 and Q2), a number having a size of about 320 bits (80 bits*4=320 Bits) is obtained. In this case, for a 1024 bit size, 704 bits (=1024 bits-320 bits) are necessary. Accordingly, since a size of the remaining small-primes is 40 bits, which is a half of 80 bits, 704/40 bits=17.6. Since the number $_\alpha$ of P and the number a of Q are equal, 17.6/2=8.8. Accordingly, $_\alpha$=9. Therefore, since P1*P2*P3* . . . *P8=480 bits and Q1*Q2*Q3* . . . *Q8=480 bits, last P9 and Q9 are determined to have 32 bits (=(1024−(480*2))/2). Therefore, the number of prime factors is 22 (=4 large-primes+18 small-primes).

Further, the condition and the total number of the chains are adjusted according to results of the parameter setting and the condition setting considering the time-memory trade off (TMTO) in the pre-computation table generation unit 420.

For example, a value changed through an r-adding walk function, which is a random function, and then having a certain pattern is called a chain. A case in which 20 bits have the following pattern "11111111 00000000 xxxx1111" when any value is represented by a binary number is called a condition of the chain.

11111111 00000000 01011111 . . .
11111111 00000000 10101111 . . .
11111111 00000000 01101111 . . .

A size of the pattern may vary according to safety and systematic element and a value constituting the pattern may also vary according to convenience. For example, even when the same 20 bits are checked, a condition of a form "10101010 10101010 xxxx1010" is possible. Therefore, it is necessary for the condition of the chain to be created to be able to be changed in consideration of a mathematical characteristic and the system. The number of chains means the number of chains meeting the above-described condition to be created. This must be created to be able to be adjusted according to performance expected by the system in consideration of a time-memory trade off (TMTO) relationship.

The present invention can be implemented as computer-readable code in a computer-readable recording medium. The computer-readable recording medium includes any type of recording device in which data that can be read by a computer system is stored. Examples of the computer-readable recording medium include a ROM, a RAM, a CD-ROM, a magnetic tape, a floppy disk, an optical data storage device, etc. and further include a medium implemented in the form of a carrier wave (e.g., transmission through the Internet). Further, the computer-readable recording medium may be distributed to computer systems connected over a wired/wireless network, and computer-readable code may be stored and executed in a distributive manner.

While the preferred exemplary embodiments of the present invention have been shown and described, it will be apparent to those skilled in the art that various modifications can be made without departing from the spirit and scope of the invention.

REFERENCE SIGNS LIST

100: private key generation apparatus
110: ID conversion unit
120: private key calculation unit
200: client or server
410: setting unit
420: pre-computation table generation unit
430: discrete logarithm calculation unit

What is claimed is:

1. A private key generation apparatus intended for use in generating a private key corresponding to a user ID using the user ID as a public key, the apparatus comprising:
   an ID conversion unit configured to output a specific element value of one discrete logarithm cyclic group having a one-to-one correspondence relationship with an input user ID by using a value of a previously set length irrespective of a length of the input user ID; and
   a private key calculation unit configured to:
      calculate a discrete logarithm result value based on the output specific element value of the one discrete logarithm cyclic group; and
      calculate a private key having a one-to-one correspondence relationship with the input user ID by using parameters set so that the input user ID as the input value and the discrete logarithm result value as the output value are in one-to-one correspondence to each other,
   wherein the private key calculation unit comprises:
      a setting unit configured to set parameters for one-to-one correspondence between the input user ID and the discrete logarithm result value;
      a pre-computation table generation unit configured to store a value of a result of performing a multiplication operation using the set parameters in the form of a data structure to generate a lookup table, and store a chain value of a cyclic function value taking into account a time-memory trade off using the lookup table, in the form of a data structure, to generate a pre-computation table; and
      a discrete logarithm calculation unit configured to receive data from the setting unit and the pre-computation table generation unit, and calculate a discrete logarithm result value using an index value of the pre-computation table,
   wherein at least one of the ID conversion unit and the private key calculation unit is implemented as a hardware component.

2. The private key generation apparatus according to claim 1, wherein the ID conversion unit is further configured to:
   convert an ID, using a function in which the input user ID and the output specific element value have a one-to-one correspondence relationship, so as to provide a converted value;
   determine whether a jacobi value of the converted value corresponds to a previously set reference value; and
   cause the input user ID and the generated private key to have a one-to-one correspondence relationship.

3. The private key generation apparatus according to claim 2, wherein the ID conversion unit is further configured to:
   apply a hash function to the input user ID to generate a first conversion value of a number having a certain length;
   generate a second conversion value obtained by adding data having a certain bit size to the first conversion value; and
   determine whether the jacobi value of the second conversion value corresponds to the previously set reference value.

4. The private key generation apparatus according to claim 3, wherein when the jacobi value of the second conversion value does not correspond to the previously set reference value, a value of the added data is continuously changed.

5. The private key generation apparatus according to claim 1, wherein the setting unit is configured to:
   set a prime number parameter P whose remainder is 1 when divided by 4, and a prime number parameter Q whose remainder is 3 when divided by 4; and
   define a new parameter N (N=P*Q) using the parameters P and Q to set sizes of the respective parameters N, P and Q.

6. The private key generation apparatus according to claim 5, wherein the private key generation apparatus is further configured to confirm:

whether the greatest common divisor of (P−1)/2 and (Q−1)/2 is 1 using the parameters P and Q; and whether the sizes of the parameters N, P and Q meet the set values.

7. The private key generation apparatus according to claim 5, wherein the private key generation apparatus is further configured to adjust one or more of the sizes and the numbers of the prime factors constituting the parameters P and Q according to the set values of the parameters in the setting unit.

8. The private key generation apparatus according to claim 1, wherein the private key generation apparatus is further configured to adjust one or more of a condition of the chains and a total number of necessary chains according to:

the set values of the parameters of the pre-computation table generation unit, and set values that take into consideration the time-memory trade off.

9. A private key generation method performed by a private key generation apparatus, intended for use in generating a private key corresponding to a user ID using the user ID as a public key, the method comprising:

(a) outputting a specific element value of one discrete logarithm cyclic group having a one-to-one correspondence relationship with an input user ID by using a value of a previously set length irrespective of a length of the input user ID; and (b) calculating a discrete logarithm result value based on the output specific element value of the one discrete logarithm cyclic group and calculating a private key having a one-to-one correspondence relationship with the input user ID by using parameters which are set so that the input user ID that is the input value and the discrete logarithm result value that is the output value correspond to each other in one to one, wherein step (b) comprises:

(b1) setting parameters for one-to-one correspondence between the input user ID and the discrete logarithm result value;

(b2) storing a value of a result of performing a multiplication operation using the set parameters in the form of a data structure to generate a lookup table, and storing a chain value of a cyclic function value taking into account a time-memory trade off (TMTO) using the lookup table, in the form of a data structure, to generate a pre-computation table; and (b3) receiving data from the pre-computation table, and calculating a discrete logarithm result value using an index value of the pre-computation table.

10. The private key generation method according to claim 9, wherein step (a) includes:

converting an ID using a function in which the input user ID and the output specific element value have a one-to-one correspondence relationship, so as to provide a converted value;

determining whether a jacobi value of the converted value corresponds to a previously set reference value; and causing the input user ID and the generated private key to have a one-to-one correspondence relationship.

11. The private key generation method according to claim 10, wherein step (a) further includes:

applying a hash function to the input ID to generate a first conversion value of a number having a certain length;

generating a second conversion value obtained by adding data having a certain bit size to the first conversion value; and determining whether the jacobi value of the second conversion value corresponds to the previously set reference value.

12. The private key generation method according to claim 11, wherein when the jacobi value of the second conversion value does not correspond to the previously set reference value, a value of the added data is continuously changed.

13. The private key generation method according to claim 9, wherein step (b) includes:

setting a prime number parameter P whose remainder is 1 when divided by 4, and a prime number parameter Q whose remainder is 3 when divided by 4; and defining a new parameter N (N=P*Q) using the parameters P and Q to set sizes of the respective parameters N, P and Q.

14. The private key generation method according to claim 13, further comprising:

confirming whether the greatest common divisor of (P−1)/2 and (Q−1)/2 is 1 using the parameters P and Q; and confirming whether the sizes of the parameters N, P and Q meet the set values.

15. The private key generation method according to claim 13, further comprising adjusting the sizes and the numbers of the prime factors constituting the parameters P and Q, according to the set values of the parameters.

16. The private key generation method according to claim 9, further comprising adjusting a condition of the chains and a total number of necessary chains according to:

the set values of the parameters of the pre-computation table; and set values that take into consideration the time-memory trade off.

17. A private key generation method performed by a private key generation apparatus, intended for use in generating a private key corresponding to a user ID using the user ID as a public key, the method comprising:

setting predetermined parameters, in advance, for use in obtaining a one-to-one correspondence between a user ID to be received in the future, and a discrete logarithm result value; then receiving the user ID as an input user ID;

using the predetermined parameters which are set so that the input user ID that is the input value and the discrete logarithm result value that is the output value correspond to each other in one to one, obtaining the one-to-one correspondence between the input user ID and the discrete logarithm result value; and calculating a discrete logarithm result value based on the output specific element value of the one discrete logarithm cyclic group and calculating a private key having a one-to-one correspondence relationship with the input user ID by using parameters which are set so that the input user ID that is the input value and the discrete logarithm result value that is the output value correspond to each other in one to one, wherein the calculating comprises setting parameters for one-to-one correspondence between the input user ID and the discrete logarithm result value; storing a value of a result of performing a multiplication operation using the set parameters in the form of a data structure to generate a lookup table, and storing a chain value of a cyclic function value taking into account a time-memory trade off (TMTO) using the lookup table, in the form of a data structure, to generate a pre-computation table; and receiving data from the pre-computation table, and calculating a discrete logarithm result value using an index value of the pre-computation table.

18. The private key generation method according to claim 17, wherein the predetermined parameters include a prime number parameter P whose remainder is 1 when divided by 4, and a prime number parameter Q whose remainder is 3 when divided by 4.

19. The private key generation method according to claim 18, further comprising defining a new parameter N (N=P*Q) using the parameters P and Q to set sizes of the respective parameters N, P and Q.

20. A private key generation method performed by a private key generation apparatus, intended for use in generating a private key corresponding to a user ID using the user ID as a public key, the method comprising:

setting a jacobi value based on the user ID;

outputting a specific element value of one discrete logarithm cyclic group having a one-to-one correspondence relationship with the input user ID, based on the previously set jacobi value by using a value of a previously set length irrespective of a length of the input user ID; and calculating a discrete logarithm result value based on the output specific element value of the one discrete logarithm cyclic group and calculating a private key having a one-to-one correspondence relationship with the input user ID by using parameters which are set so that the input user ID that is the input value and the discrete logarithm result value that is the output value correspond to each other in one to one, wherein the calculating comprises setting parameters for one-to-one correspondence between the input user ID and the discrete logarithm result value; storing a value of a result of performing a multiplication operation using the set parameters in the form of a data structure to generate a lookup table, and storing a chain value of a cyclic function value taking into account a time-memory trade off (TMTO) using the lookup table, in the form of a data structure, to generate a pre-computation table; and receiving data from the pre-computation table, and calculating a discrete logarithm result value using an index value of the pre-computation table.

21. The private key generation method according to claim 20, further comprising:

converting an ID using a function in which the user ID that is an input value and the output specific element value have a one-to-one correspondence relationship;

making a determination as to whether a jacobi value of the converted value corresponds to a previously set reference value; and causing the user ID and the generated private key to have a one-to-one correspondence relationship in accordance with the determination.

22. The private key generation method according to claim 20, further comprising:

applying a predetermined hash function to the user ID to generate a first conversion value of a number having a certain length;

generating a second conversion value obtained by adding data having a certain bit size to the first conversion value; and determining whether the jacobi value of the second conversion value corresponds to the previously set reference value.

23. A non-transitory computer-readable recording medium storing instructions configured to enable a computer processor to execute operations implementing a private key generation method comprising:

(a) outputting a specific element value of one discrete logarithm cyclic group having a one-to-one correspondence relationship with an input user ID by using a value of a previously set length irrespective of a length of the input user ID; and (b) calculating a discrete logarithm result value based on the output specific element value of the one discrete logarithm cyclic group and calculating a private key having a one-to-one correspondence relationship with the input user ID by using parameters which are set so that the input user ID that is the input value and the discrete logarithm result value that is the output value correspond to each other in one to one, wherein step (b) comprises:

(b1) setting parameters for one-to-one correspondence between the input user ID and the discrete logarithm result value;

(b2) storing a value of a result of performing a multiplication operation using the set parameters in the form of a data structure to generate a lookup table, and storing a chain value of a cyclic function value taking into account a time-memory trade off (TMTO) using the lookup table, in the form of a data structure, to generate a pre-computation table; and (b3) receiving data from the pre-computation table, and calculating a discrete logarithm result value using an index value of the pre-computation table.

* * * * *